US008510423B2

(12) United States Patent
Matsuura et al.

(10) Patent No.: US 8,510,423 B2
(45) Date of Patent: Aug. 13, 2013

(54) INSTALL SYSTEM AND INSTALL METHOD

(75) Inventors: Masaki Matsuura, Iwaki (JP); Masato Shibata, Iwaki (JP); Yasuhiko Kawasaki, Iwaki (JP); Hideaki Takeda, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 132 days.

(21) Appl. No.: 13/281,918

(22) Filed: Oct. 26, 2011

(65) Prior Publication Data

US 2012/0198035 A1   Aug. 2, 2012

(30) Foreign Application Priority Data

Jan. 31, 2011   (JP) .................................. 2011-017784

(51) Int. Cl.
*G06F 15/177* (2006.01)

(52) U.S. Cl.
USPC ............................ 709/222; 709/220; 709/223

(58) Field of Classification Search
USPC ........................... 709/220, 222, 223, 227, 203
See application file for complete search history.

(56) References Cited

U.S. PATENT DOCUMENTS

| 6,425,522 | B1 | 7/2002 | Matsumoto et al. |
| 7,600,228 | B2 | 10/2009 | Takekawa et al. |
| 2005/0003810 | A1* | 1/2005 | Chu et al. ....................... 455/418 |
| 2008/0172665 | A1* | 7/2008 | McIlroy ......................... 717/177 |
| 2009/0182851 | A1* | 7/2009 | King et al. ..................... 709/222 |
| 2010/0121941 | A1* | 5/2010 | Harrang et al. ............... 709/219 |
| 2010/0293303 | A1* | 11/2010 | Choi ............................... 710/16 |
| 2012/0054300 | A1* | 3/2012 | Marchwicki et al. .......... 709/217 |

FOREIGN PATENT DOCUMENTS

JP        2005-050306        2/2005

* cited by examiner

*Primary Examiner* — Philip B Tran
(74) *Attorney, Agent, or Firm* — Brinks Hofer Gilson & Lione

(57) ABSTRACT

An install system includes a host device, a portable device configured to connect with the host device, and a host device application providing system to which the host device is accessible via a network. The host device includes a host device application execution unit configured to execute host device applications as applications for host devices and an automatic install unit. The portable device includes a portable device application execution unit configured to execute portable device applications as applications for portable devices. The host device application providing system includes a host device application database for storing install data on host device applications contained therein and a host device application download server for transferring the install data on the host device applications stored in the host device application database, to the host device.

13 Claims, 9 Drawing Sheets

FIG. 3

| SP-AP IDENTIFIER | H-AP IDENTIFIER | H-AP EXECUTION ENVIRONMENT |
|---|---|---|
| SP-AP IDENTIFIER | H-AP IDENTIFIER | H-AP EXECUTION ENVIRONMENT |
| CAL for R V. 1. 2 | CAL Agnt #xxx | MACHINE TYPE A |
| | CAL Agnt #zzz | MACHINE TYPE B |

SP-AP ASSOCIATION DATA

PACKAGE FOR SP-AP X
IN-VEHICLE DEVICE #A

PACKAGE FOR H-AP Y
SMARTPHONE #R

INSTALL SYSTEM AND INSTALL METHOD

PRIORITY CLAIM

This application claims the benefit of Japanese Patent Application No. 2011-017784, filed on Jan. 31, 2011, and which is incorporated by reference herein in its entirety.

BACKGROUND

1. Field of the Invention

The present invention relates to a technique for installing applications operating in a mutually-associated manner into a portable device and a host device to which the portable device is connected.

2. Description of the Related Art

As the technique for installing applications operating in a mutually-associated manner into a portable device and a host device to which the portable device is connected, there is known a technique in which in a system comprising an IC card as the portable device and a terminal device as the host device for IC card having the IC card mounted thereon, the IC card executing applications stores therein data on terminal applications as applications operating in association with the applications in the terminal device, when the IC card is mounted on the terminal device, the data on the terminal applications is transferred from the IC card to the terminal device, and the transferred data is used to install and execute the terminal applications in the terminal device (for example, Japanese Patent Application Laid-Open 2005-50306).

SUMMARY

Typically, applications executable in an execution environment, which provide the same functions, are different per application execution environment such as machine type of a portable device or host device. Thus, for example, when an application associated with an application X of the portable device is an application Y in the host device of machine type A and the application Y is not executable in the host device of machine type B due to machine type dependence, another application Z is prepared in the host device of machine type B as an application associated with the application X of the portable device.

An application of the portable device and an application of the host device, which operate in a mutually-associated manner, may be provided to a user via different routes in many cases. For example, when the application of the portable device is provided to the portable device from an online application store dedicated for portable devices, the application of the host device, which is not for portable devices, is provided via another route.

Thus, when applications operating in a mutually-associated manner are installed in the portable device and the host device to which the portable device is connected, the user his/herself needs to perform complicated works to specify a proper combination of an application of the portable device and an application of the host device, to obtain each application via each providing route and to install the obtained applications into the portable device and the host device, respectively. Also with the technique described in Japanese Patent Application Laid-Open 2005-50306, the user similarly needs to perform complicated works to specify a proper combination of an application of the portable device and an application of the host device and to obtain each application via each providing route.

According to the technique described in Japanese Patent Application Laid-Open 2005-50306, there occur the problems that applications for all the machine types of host device to which a portable device is connectable need to be always held in the portable device and thus a storage resource of the portable device is prevented from being effectively used and that an application of the host device starts being installed when the portable device is connected to the host device and thus a long time is needed until the application of the host device enters usable.

Therefore, it is an object of the present invention to enable applications operating in a mutually-associated manner to be installed in a portable device and a host device to which the portable device is connected without user's complicated works.

In order to solve the problems, the present invention provides an install system comprising a host device, a portable device connectable to the host device, and a host device application providing system to which the host device is accessible via a network, wherein the host device comprises a host device application execution unit for executing host device applications as applications for host devices installed in the host device, and an automatic install unit, the portable device comprises a portable device application execution unit for executing portable device applications as applications for portable devices installed in the portable device, the host device application providing system comprises a host device application database for storing install data on host device applications therein and a host device application download server for transferring the install data on the host device applications stored in the host device application database to the host device, and the automatic install unit of the host device obtains an identification of a portable device application installed in the portable device from the portable device connected to the host device, downloads install data on a host device application operating in association with the portable device application whose identification is obtained from the host device application download server, and uses the install data to install the host device application operating in association with the portable device application whose identification is obtained in the host device.

The install system may be such that the host device application providing system comprises a correspondence management unit which manages correspondences between the portable device applications and the host device applications operating in association with the portable device applications and replies the correspondences in response to a request from the host device, and the automatic install unit of the host device inquires a host device application operating in association with the portable device application whose identification is obtained from the portable device to the correspondence management unit and specifies it. In this case, the correspondence management unit of the host device application providing system manages correspondences between the portable device applications, the host device applications operating in association with the portable device applications, and host device application execution environments to which the host device applications correspond, and replies the correspondences in response to a request from the host device, and the automatic install unit of the host device inquires a host device application corresponding to a host device application execution environment of the host device and operating in association with the portable device application whose identification is obtained from the portable device to the correspondence management unit and specifies it, downloads install data on the specified host device application from the host device application download server, and uses the install data to install the host device application operating in association with the portable device application whose identification is obtained in the host device.

The install system may be such that the host device is an in-vehicle device and the host device application execution environment is an in-vehicle device machine type.

According to the install system, an appropriate host device application associated with a portable device application can be automatically installed in the host device only by user's installing the portable device application in the portable device. Thus, the user's work of installing mutually-associated applications in the host device and the portable device is facilitated.

In order to solve the problems, the present invention provides an install system comprising a portable device, a host device connectable to the portable device, and a portable device application providing system to which the portable device is accessible via a network, wherein the portable device comprises a portable device application execution unit for executing portable device applications as applications for portable devices installed in the portable device, and an automatic install unit, the host device comprises a host device application execution unit for executing host device applications as applications for host devices installed in the host device, the portable device application providing system comprises a portable device application database for storing install data on portable device applications therein and a portable device application download server for transferring the install data on the portable device applications stored in the portable device application database to the portable device, and the automatic install unit of the portable device obtains an identification of the host device application installed in the host device from the host device connected to the portable device, downloads install data on a portable device application operating in association with the host device application whose identification is obtained from the portable device application download server, and uses the install data to install the portable device application operating in association with the host device application whose identification is obtained in the portable device.

The install system may be such that the portable device application providing system comprises a correspondence management unit for managing correspondences between the host device applications and the portable device applications operating in association with the host device applications and for replying the correspondences in response to a request from the portable device, and the automatic install unit of the portable device inquires a portable device application operating in association with the host device application whose identification is obtained from the host device to the correspondence management unit and specifies it. In this case, the correspondence management unit of the portable device application providing system manages correspondences between the host device applications, the portable device applications operating in association with the host device applications and portable device application execution environments to which the portable device applications correspond, and replies the correspondences in response to a request from the portable device, and the automatic install unit of the portable device inquires a portable device application corresponding to a portable device application execution environment of the portable device and operating in association with the host device application whose identification is obtained from the host device to the correspondence management unit and specifies it, downloads install data on the specified portable device application from the portable device application download server, and uses the install data to install the portable device application operating in association with the host device application whose identification is obtained in the portable device.

With the install system, an appropriate portable device application associated with a host device application can be automatically installed in the portable device only by user's installing the host device application in the host device. Thus, the user's work of installing mutually-associated applications in the host device and the portable device is facilitated.

In order to solve the problems, the present invention provides an install system comprising a portable device, a host device connectable to the portable device, and a portable device application providing system to which the portable device is accessible via a network, wherein the portable device application providing system comprises a portable device application database for storing install data on portable device applications as applications for portable devices therein, and a portable device application download server for transferring the install data on the portable device applications stored in the portable device application database to the portable device, the host device comprises a host device application execution unit for executing host device applications as applications for host devices installed in the host device, and an install processing unit, the portable device comprises a portable device application execution unit for executing portable device applications installed in the portable device, a download unit for downloading install data on the portable device applications from the portable device application download server and installing the portable device applications in the portable device, and an association application install data transfer unit. The install data on the portable device applications to be transferred by the portable device application download server includes install data on the host device applications operating in association with the portable device applications, when being connected to the host device, the association application install data transfer unit of the portable device transfers the install data on the host device applications included in the install data on the portable device applications to the host device, and the install processing unit of the host device uses the install data on the host device applications transferred from the association application install data transfer unit of the portable device to install the host device applications in the host device.

In the install system, the association application install data transfer unit of the portable device is a portable device application installed in the portable device by the download unit by use of the install data on the portable device applications including the install data on the host device applications to be transferred by the association application install data transfer unit to the host device.

With the install system, an appropriate host device application associated with a portable device application can be automatically installed in the host device only by user's installing the portable device application in the portable device. Thus, the user's work of installing mutually-associated applications in the host device and the portable device is facilitated.

In order to solve the problems, the present invention provides an install system comprising a host device, a portable device connectable to the host device, and a host device application providing system to which the host device is accessible via a network, wherein the host device application providing system comprises a host device application database for storing install data on host device applications as applications for the host device therein, and a host device application download server for transferring the install data on the host device applications stored in the host device application database to the host device, the portable device comprises a portable device application execution unit for executing portable device applications as applications for portable devices installed in the portable device, and an install processing unit, the host device comprises a host device application execution unit for executing host device applications installed in the host device, a download unit for downloading install data on the host device applications from the host device application download server and installing the host device applications in the host device, and an association application install data transfer unit. The install data on the host device applications to be transferred by the host device application download server includes install data on the portable device applications operating in association with the host device applications, when being connected to the portable device, the association application install data transfer unit of the host device transfers the install data on the portable device applications included in the install data on the host device applications to the portable device, and the install processing unit of the portable device uses the install data on the portable device applications transferred from the association application install data transfer unit of the host device to install the portable device applications in the portable device.

The install system may be such that the association application install data transfer unit of the host device is a host device application installed in the host device by the download unit by use of the install data on the host device applications including the install data on the host device applications to be transferred by the association application install data transfer unit to the portable device.

With the install system, an appropriate portable device application associated with a host device application can be automatically installed in the portable device only by user's installing the host device application in the host device. Thus, the user's work of installing mutually-associated applications in the host device and the portable device is facilitated.

In each install system described above, the host device may be an in-vehicle device and the portable device may be a smartphone.

As described above, applications operating in a mutually-associated manner can be installed in the portable device and the host device connected to the portable device without user's complicated works.

BRIEF DESCRIPTION OF THE DRAWINGS

FIG. 3 is a diagram showing a H-AP correspondence table according to the first embodiment of the present invention;

DETAILED DESCRIPTION

Embodiments of the present invention will be described below for a case in which a host device is an in-vehicle device and a portable device connected to the host device is a smartphone.

A first embodiment will be first described.

Figure 1:
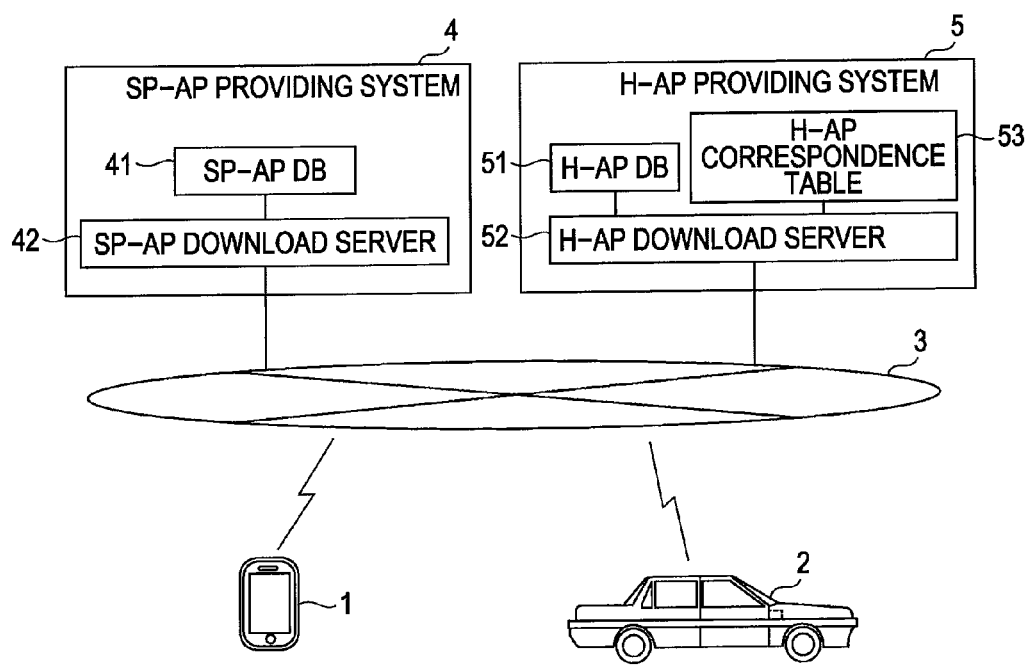
FIG. 1 is a block diagram showing a structure of a system according to a first embodiment of the present invention.

FIG. 1 shows a structure of a system for installing applications in the in-vehicle device and the smartphone according to the first embodiment.

As shown, the system comprises a smartphone 1 owned by a user, an in-vehicle device 2 mounted on a vehicle, a SP-AP (smartphone application) providing system 4 accessible by the smartphone 1 via WAN 3 such as Internet, and a H-AP providing system 5 accessible by the in-vehicle device 2 via the WAN 3.

SP-AP (smartphone application) is an application for smartphones, and the SP-AP providing system 4 comprises a SP-AP database 41 accumulating various SP-AP install files therein, and a SP-AP download server 42 for providing various items of attribute information on each SP-AP whose install file is accumulated in the SP-AP database 41 to the smartphone 1 and for transferring (downloading) the SP-AP install files accumulated in the SP-AP database 41 to the smartphone 1.

H-AP is an application for in-vehicle devices, and the H-AP providing system 5 comprises a H-AP database 51 accumulating various H-AP install files therein, a H-AP download server 52 for providing various items of attribute information on each H-AP whose install file is accumulated in the H-AP database 51 to the in-vehicle device 2 and transferring (downloading) the H-AP install files accumulated in the H-AP database 51 to the in-vehicle device 2, and a H-AP correspondence table 53.

Figure 2:
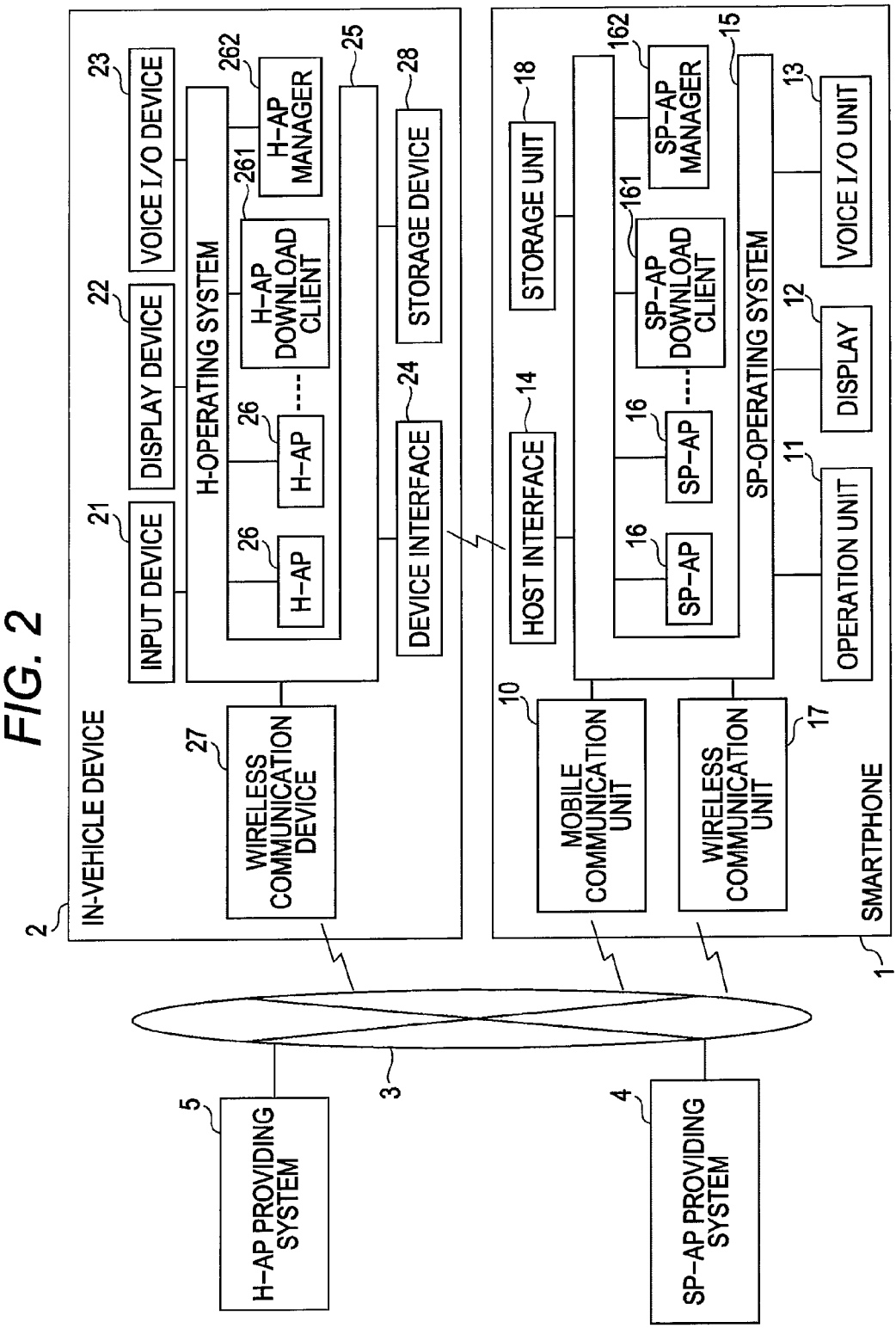
FIG. 2 is a block diagram showing a structure of an in-vehicle device and a smartphone according to the first embodiment of the present invention.

FIG. 2 shows a structure of the in-vehicle device 2 and the smartphone 1 according to the first embodiment.

As shown, the smartphone 1 comprises a mobile communication unit 10 for accessing a mobile phone network, an operation unit 11, a display 12, a voice I/O unit 13 provided with microphone or speaker, a host interface 14 for connecting to the in-vehicle device 2, a SP-operating system 15 as the OS of the smartphone 1, SP-AP 16 as applications which are managed by the SP-operating system 15 and operate on the SP-operating system 15, a wireless communication unit 17 for connecting to PAN or LAN, and a storage unit 18.

The smartphone 1 can connect to the WAN 3 via PAN or LAN connected by the wireless communication unit 17 to access the SP-AP providing system 4. The smartphone 1 can connect to the WAN 3 via the mobile phone network connected by the mobile communication unit 10 to access the SP-AP providing system 4.

The smartphone 1 comprises multiple applications such as a mobile phone application for providing a mobile phone function using the mobile communication unit 10, the voice I/O unit 13 or the operation unit 11 as the SP-AP 16. The smartphone 1 can be provided with, as the SP-AP 16, applications for performing various processings associated with the H-AP of the in-vehicle device 2, such as an application for transmitting information to be processed by the H-AP to the H-AP or an application for receiving and processing information from the H-AP.

The smartphone 1 comprises, as one of the SP-AP 16, a SP-AP download client 161 which accesses the SP-AP providing system 4, downloads an install file of the SP-AP 16 into the storage unit 18, develops the downloaded install file, and installs the SP-AP 16 in the smartphone 1 to be one of the SP-AP 16 provided in the smartphone 1.

The smartphone 1 comprises a SP-AP manager 162 for managing each SP-AP 16 provided in the smartphone 1 as one of the SP-AP 16.

The in-vehicle device 2 comprises an input device 21, a display device 22, a voice I/O device 23 provided with microphone or speaker, a device interface 24 for connecting to the smartphone 1, a H-operating system 25 as the OS of the in-vehicle device 2, H-AP 26 as applications which are managed by the H-operating system 25 and operate on the H-operating system 25, a wireless communication device 27 for connecting to the WAN 3, and a storage device 28.

The in-vehicle device 2 can be provided with, as the H-AP 26, applications for performing various processings associated with the SP-AP 16 of the smartphone 1 such as an application for providing a user interface of the SP-AP 16 using the input device 21 and the display device 22, an application for transmitting information to be processed by the SP-AP 16 to the SP-AP 16 and an application for receiving and processing information from the SP-AP 16.

Hereinafter, when H-AP Y of the in-vehicle device 2 and SP-AP X of the smartphone 1 perform mutually-associated processings, SP-AP X is called association SP-AP of H-AP Y and H-AP Y is called association H-AP of SP-AP X.

The in-vehicle device 2 comprises, as one of the H-AP 26, a H-AP download client 261 which accesses the H-AP providing system 5, downloads an install file of the H-AP 26 in the storage device 28, develops the downloaded install file, and installs the H-AP 26 in the in-vehicle device 2 to be one of the H-AP 26 provided in the in-vehicle device 2.

The in-vehicle device 2 comprises a H-AP manager 262 for managing the H-AP 26 provided in the in-vehicle device 2 as one of the H-AP 26.

The host interface 14 of the smartphone 1 and the device interface 24 of the in-vehicle device 2 are interconnected via Bluetooth (registered trademark), WIFI or USB for mutual communication. The wireless communication unit 17 of the smartphone 1 is for making wireless communication different from the communication made by the host interface 14.

The smartphone 1 is configured of a computer comprising a CPU and a memory in hardware, and the computer executes predetermined computer programs stored in the storage unit 18 to realize the SP-operating system 15 and the SP-AP 16.

Similarly, the in-vehicle device 2 is configured of a computer comprising a CPU and a memory in hardware, and the computer executes predetermined computer programs stored in the storage device 28 to realize the H-operating system 25 and the H-AP 26.

FIG. 3 shows the contents of the H-AP correspondence table 53 provided in the H-AP providing system 5.

As shown, the H-AP correspondence table 53 has SP-AP association data provided per SP-AP for which an association H-AP is present, and each item of SP-AP association data registers therein combinations of a SP-AP identifier indicating an identification of a corresponding SP-AP 16, a H-AP identifier indicating an identification of an association H-AP for the association H-AP of the corresponding SP-AP 16, and a H-AP 26 execution environment in which the association H-AP is operable. The H-AP 26 execution environment may include a machine type of the in-vehicle device 2, a kind or version of the H-operating system 25 of the in-vehicle device 2, or other hardware/software structure of the in-vehicle device 2. Hereinafter, there will be described an example in which only the machine type of the in-vehicle device 2 is significant for identifying the H-AP 26 execution environment.

With the structure, the H-AP manager 262 of the in-vehicle device 2 performs a SP compatible download processing for installing the association H-AP of the SP-AP 16 of the smartphone 1 connected to the in-vehicle device 2 in the in-vehicle device 2.

Figure 4:
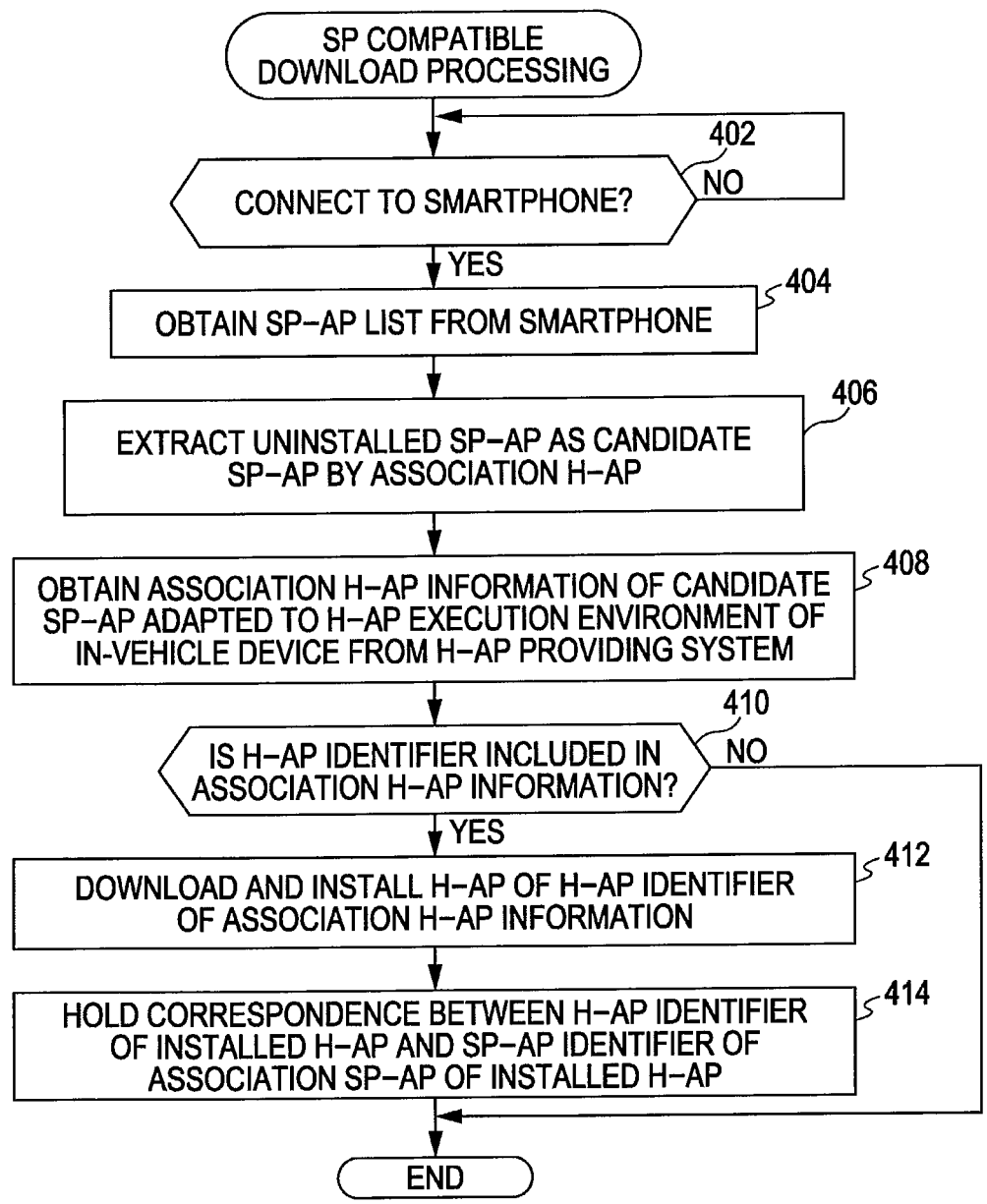
FIG. 4 is a flowchart showing a SP compatible download processing according to the first embodiment of the present invention.

FIG. 4 shows the SP compatible download processing procedure.

As shown, in the processing, when detecting that the smartphone 1 is connected to the in-vehicle device 2 via the H-operating system 25 (step 402), the H-AP manager 262 of the in-vehicle device 2 requests a SP-AP list to the SP-AP manager 162 of the smartphone 1 thereby to obtain the SP-AP list (step 404). When requested the SP-AP list by the H-AP manager 262, the SP-AP manager 162 of the smartphone 1 transmits a list of identifiers of the SP-AP 16 provided in the smartphone 1 as the SP-AP list to the H-AP manager 262. When having already transmitted the SP-AP list to the same in-vehicle device 2 as the in-vehicle device 2 which is the request source of the current SP-AP list, the SP-AP manager 162 of the smartphone 1 may transmit, as the SP-AP list, a list of identifiers of only the SP-AP 16 installed in the smartphone 1 after the transmission of the previous SP-AP list to the H-AP manager 262 in response to the request of the SP-AP list from the H-AP manager 262.

Then, the H-AP manager 262 of the in-vehicle device 2 refers to correspondences between the identifiers of the H-AP installed in the in-vehicle device 2 and the identifiers of the association SP-AP of the H-AP, which are held in step 414 described later, excludes the identifiers of the SP-AP 16 for which the association H-AP of the SP-AP 16 indicated by the identifiers are previously installed in the in-vehicle device 2 from the identifiers included in the SP-AP list obtained from the smartphone 1, thereby extracting an identifier of a candidate SP-AP which is the SP-AP 16 for which the association H-AP has not been installed in the in-vehicle device 2 yet (step 406).

The H-AP providing system 5 is accessed and an association H-AP information request including the identifier of the candidate SP-AP and the H-AP execution environment of the in-vehicle device (the machine type of the in-vehicle device 2) is issued thereby to obtain the association H-AP information of the candidate SP-AP adapted to the H-AP execution environment of the in-vehicle device as the association H-AP information (step 408).

When receiving the association H-AP information request from the H-AP manager 262 of the in-vehicle device 2, the H-AP download server 52 of the H-AP providing system 5 obtains a H-AP identifier which is paired with the H-AP execution environment in response to the association H-AP information request and is registered in the SP-AP association data, in which the identifier of the candidate SP-AP is registered as the SP-AP identifier, in the H-AP correspondence table 53 for each identifier of each candidate SP-AP in response to the association H-AP information request. The obtained list of H-AP identifiers is transmitted as the association H-AP information to the H-AP manager 262 of the in-vehicle device 2. When the H-AP identifier registered in a pair with the H-AP execution environment in response to the association H-AP information request is not present in the SP-AP association data in which the identifier of the candidate SP-AP is registered as the SP-AP identifier, the information indicating that the adapted H-AP 26 is not present is transmitted as the association H-AP information to the H-AP manager 262 of the in-vehicle device 2.

When obtaining the association H-AP information from the H-AP providing system 5, the H-AP manager 262 of the in-vehicle device 2 checks whether the H-AP identifier is included in the association H-AP information (step 410), and when not included, terminates the SP compatible download processing.

On the other hand, when the H-AP identifier is included in the association H-AP information (step 410), the H-AP download client 261 downloads and installs the install file of the H-AP 26 indicated by each H-AP identifier included in the association H-AP information from the H-AP providing system 5 into the in-vehicle device 2 (step 412).

The correspondence between the installed H-AP identifier and the SP-AP identifier for which the H-AP identifier is obtained as the identifier of the association H-AP in the association H-AP information obtained in step 408 is held for deciding the identifier of the SP-AP 16 for which the association H-AP in step 406 is previously installed in the in-vehicle device 2 (step 414).

The H-AP download client 261 performs the following operations for the download/install processing in step 412. In other words, the H-AP download client 261 issues a download request for which the H-AP identifier included in the association H-AP information is designated to the H-AP download server 52 of the H-AP providing system 5, and the H-AP download server 52 reads the H-AP 26 install file indicated by the designated H-AP identifier from the H-AP database 51 and transfers it to the H-AP download client 261. The H-AP download client 261 temporarily stores the transferred H-AP 26 install file in the storage device 28 and then develops it to install the H-AP 26 in the in-vehicle device 2 so that the H-AP 26 is one of the H-AP 26 provided in the in-vehicle device 2.

Then, the SP compatible download processing is terminated.

The SP compatible download processing performed by the H-AP manager 262 of the in-vehicle device 2 has been described above.

Figure 5:
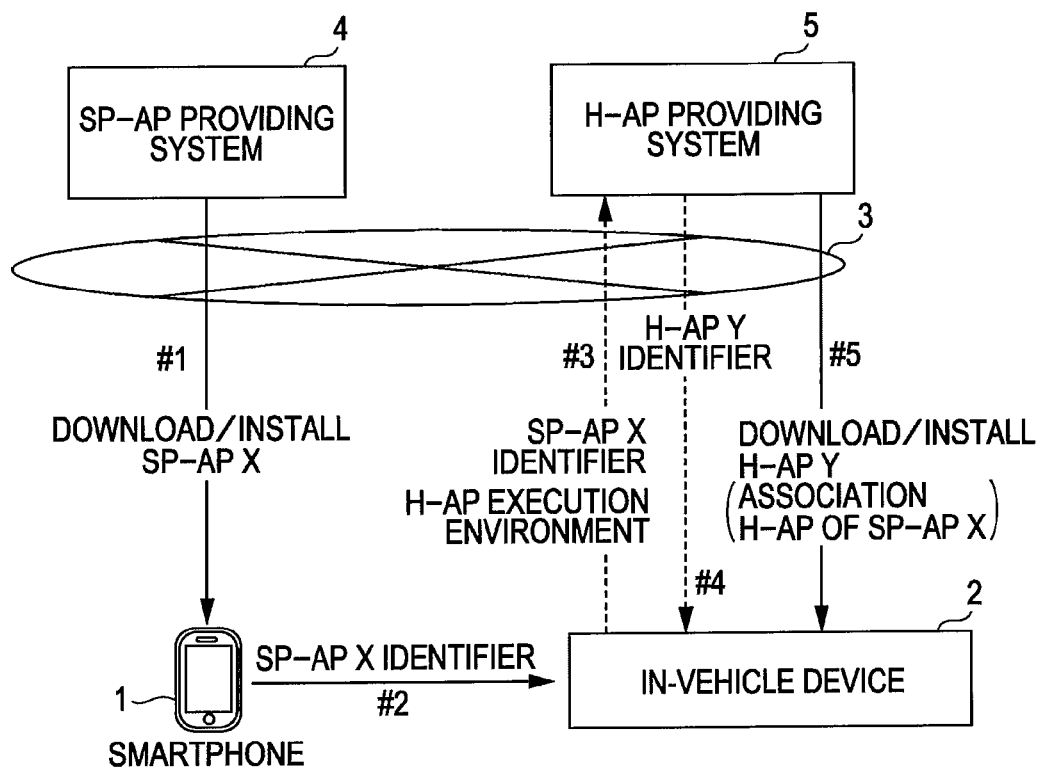
FIG. 5 is a diagram showing an install procedure according to the first embodiment of the present invention.

An exemplary SP compatible download processing is shown in FIG. 5.

As shown, the user of the smartphone 1 uses the SP-AP download client 161 of the smartphone 1 to download and install the SP-AP X from the SP-AP providing system 4 into the smartphone 1 (#1).

Thereafter, when the smartphone 1 is connected to the in-vehicle device 2, the H-AP manager 262 of the in-vehicle device 2 obtains an identifier of the SP-AP X as the SP-AP list from the SP-AP manager 162 of the smartphone 1 (#2).

The H-AP manager 262 of the in-vehicle device 2 transmits the obtained SP-AP X identifier and the H-AP execution environment of the in-vehicle device together with the association H-AP information request to the H-AP providing system 5 (#3), and obtains an identifier of the H-AP Y which is the association H-AP of the SP-AP X adapted to the H-AP execution environment of the in-vehicle device as the association H-AP information (#4).

The H-AP manager 262 of the in-vehicle device 2 notifies the H-AP download client 261 of the obtained H-AP Y identifier to download and install the H-AP Y from the H-AP providing system 5 into the in-vehicle device 2 (#5).

The first embodiment of the present invention has been described above.

In the first embodiment, the H-AP providing system 5 is provided with the H-AP correspondence table 53 and the H-AP manager 262 of the in-vehicle device 2 obtains the identifier of the association H-AP adapted to the H-AP execution environment of the in-vehicle device, which is of the SP-AP whose identifier is obtained from the smartphone 1, from the H-AP providing system 5, but the in-vehicle device 2 may be provided with the H-AP correspondence table 53 and the H-AP manager 262 may refer to the H-AP correspondence table 53 to obtain the identifier of the association H-AP adapted to the H-AP execution environment of the in-vehicle device, which is of the SP-AP whose identifier is obtained from the smartphone 1.

As described above, according to the first embodiment, the appropriate H-AP 26 associated with the SP-AP 16 can be automatically installed in the in-vehicle device 2 only by user's downloading and installing the SP-AP 16 in the smartphone 1. Thus, the user's work of installing mutually-associated applications into the in-vehicle device 2 and the smartphone 1 is facilitated.

A second embodiment of the present invention will be described below.

The second embodiment is such that the relationship between the in-vehicle device 2 and the smartphone 1 in the first embodiment is reversed in terms of the procedure of downloading and installing the SP-AP 16 and the H-AP 26. The second embodiment will be described below only for the different points from the first embodiment.

Figure 6:
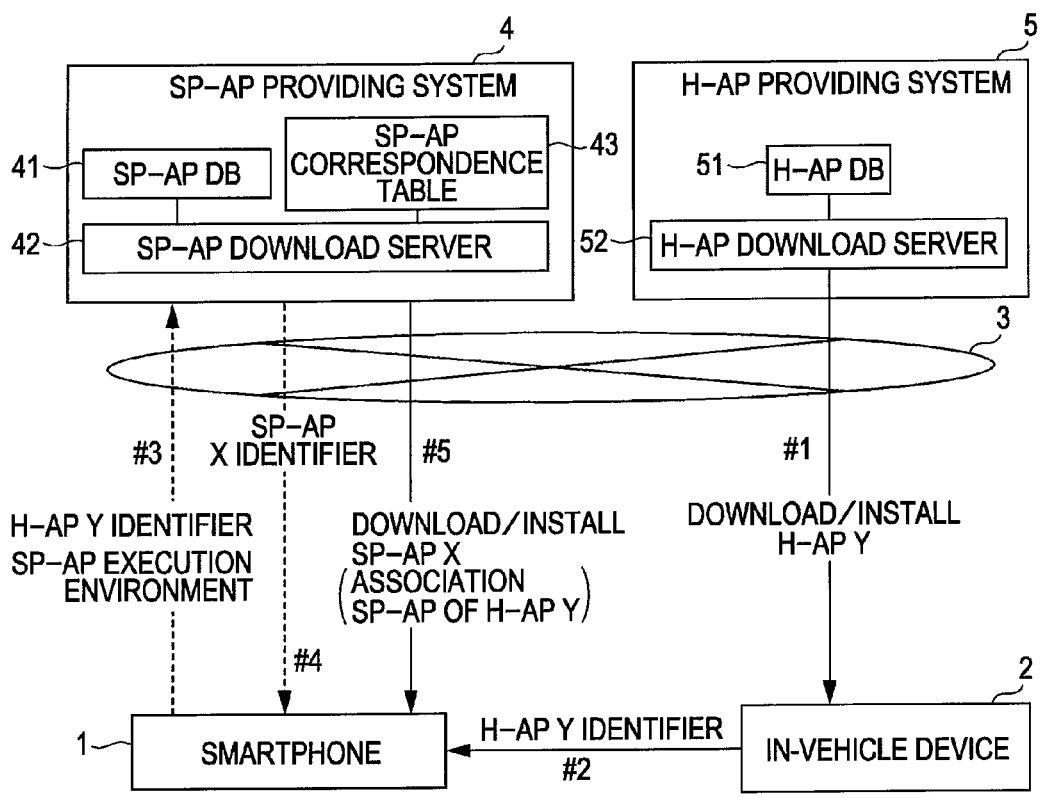
FIG. 6 is a diagram showing a structure of a system according to a second embodiment of the present invention, a SP-AP correspondence table and an install procedure.

In other words, in the second embodiment, as shown in FIG. 6a, the SP-AP providing system 4 is provided with a SP-AP correspondence table 43 in addition to the SP-AP database 41 and the SP-AP download server 42. On the other hand, the H-AP providing system 5 is configured of the H-AP database 51 and the H-AP download server 52.

As shown in FIG. 6b, the SP-AP correspondence table 43 provided in the SP-AP providing system 4 has the H-AP association data provided per H-AP for which the association SP-AP is present, and each item of H-AP association data registers therein a combination of the H-AP identifier indicating the identification of the corresponding H-AP 26, the SP-AP identifier indicating the identification of an association SP-AP for the association SP-AP of the corresponding H-AP 26, and the SP-AP 16 execution environment in which the association SP-AP is operable. The SP-AP 16 execution environment may include a machine type of the smartphone 1, a kind or version of the SP-operating system 15 of the smartphone 1 or other hardware/software structure of the smartphone 1. There will be described below an example in which only the machine type of the smartphone 1 is significant for identifying the SP-AP 16 execution environment.

In the second embodiment, the H-AP manager 262 of the in-vehicle device 2 does not perform the SP compatible download processing shown in FIG. 4.

Figure 7:
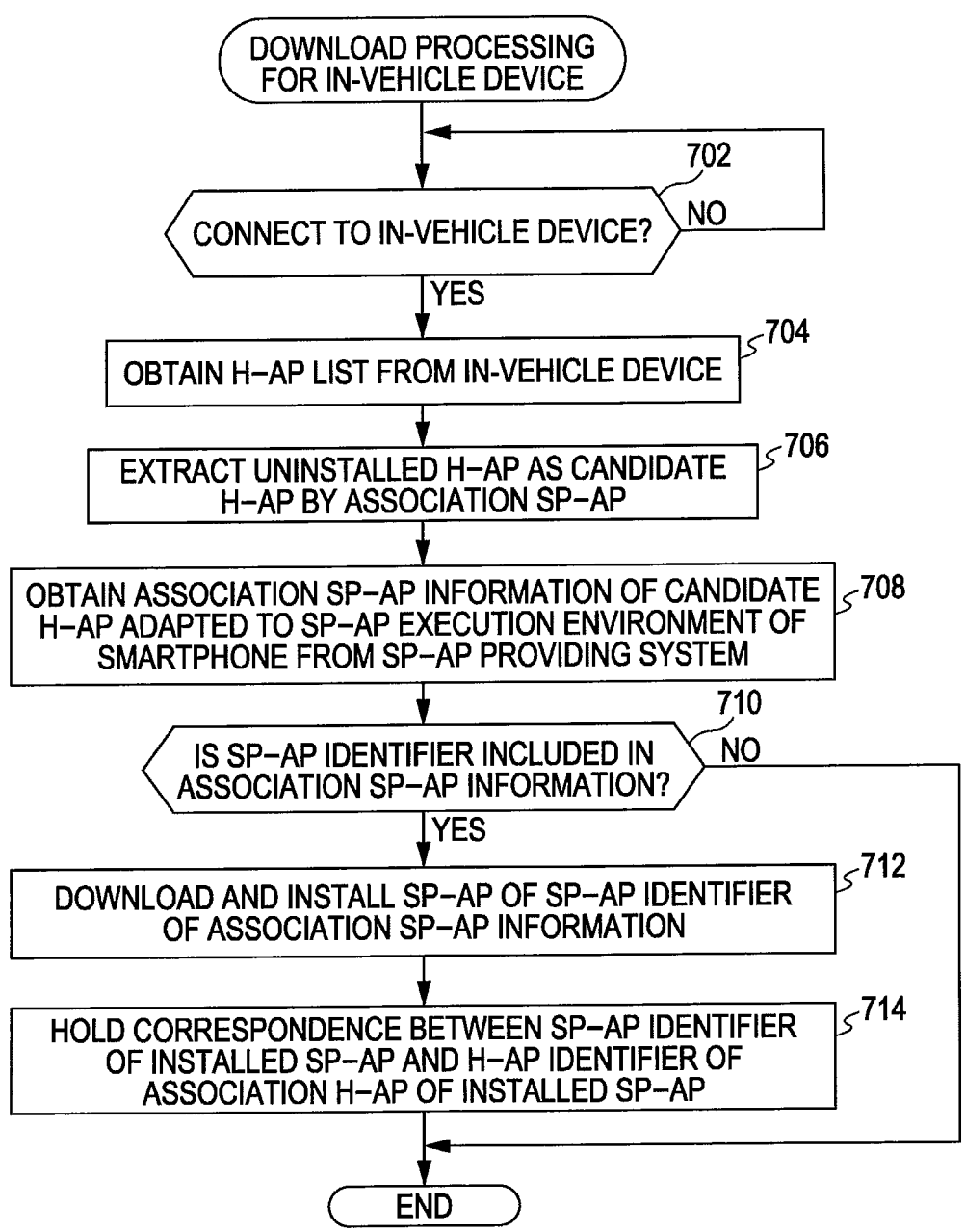
FIG. 7 is a flowchart showing a download processing for an in-vehicle device according to the second embodiment of the present invention.

On the other hand, the SP-AP manager 162 of the smartphone 1 performs the in-vehicle device download processing procedure shown in FIG. 7.

In other words, when detecting that the smartphone 1 is connected to the in-vehicle device 2 via the SP-operating system 15 in the in-vehicle device download processing (step 702), the SP-AP manager 162 of the smartphone 1 requests a H-AP list to the H-AP manager 262 of the in-vehicle device 2 to obtain the H-AP list (step 704). When requested the H-AP list by the SP-AP manager 162, the H-AP manager 262 of the in-vehicle device 2 transmits a list of identifiers of the H-AP 26 provided in the in-vehicle device 2 as the H-AP list to the SP-AP manager 162. When having already transmitted the H-AP list to the same smartphone 1 as the smartphone 1 which is the request source of the current H-AP list, the H-AP manager 262 of the in-vehicle device 2 may transmit a list of identifiers of only the H-AP 26 installed in the in-vehicle device 2 after the transmission of the previous H-AP list as the H-AP list to the SP-AP manager 162 in response to the request of the H-AP list from the SP-AP manager 162.

Then, the SP-AP manager 162 of the smartphone 1 refers to the correspondences between the identifiers of the SP-AP installed in the smartphone 1 and the identifiers of the association H-AP of the SP-AP, which are held in step 714 described later, to exclude the identifiers of the H-AP 26 for which the association SP-AP of the H-AP 26 indicated by the identifiers have been already installed in the smartphone 1 from the identifiers included in the obtained H-AP list, thereby extracting an identifier of a candidate H-AP which is the H-AP 26 for which the association SP-AP has not been installed yet in the smartphone 1 (step 706).

The SP-AP providing system 4 is accessed and the association SP-AP information request is issued together with the identifier of the candidate H-AP and the SP-AP execution environment of the smartphone (the machine type of the smartphone 1) so that the information on the association SP-AP of the candidate H-AP adapted to the SP-AP execution environment of the smartphone is obtained as the association SP-AP information (step 708).

When receiving the association SP-AP information request from the SP-AP manager 162 of the smartphone 1, the SP-AP download server 42 of the SP-AP providing system 4 obtains the SP-AP identifier which is paired with the SP-AP execution environment in response to the association SP-AP information request and is registered in the H-AP association data in which the identifier of the candidate H-AP is registered as the H-AP identifier in the SP-AP correspondence table 43 for each identifier of each candidate H-AP in response to the association SP-AP information request. The obtained list of SP-AP identifiers is transmitted as the association SP-AP information to the SP-AP manager 162 of the smartphone 1. When the SP-AP identifier registered in a pair with the SP-AP execution environment in response to the association SP-AP information request is not present in the H-AP association data in which the identifier of the candidate H-AP is registered as the H-AP identifier, the information indicating that the adapted SP-AP 16 is not present is transmitted as the association SP-AP information to the SP-AP manager 162 of the smartphone 1.

When obtaining the association SP-AP information from the SP-AP providing system 4, the SP-AP manager 162 of the smartphone 1 checks whether the SP-AP identifier is included in the association SP-AP information (step 710), and when not included, terminates the in-vehicle device compatible download processing.

On the other hand, when the H-AP identifier is included in the association SP-AP information (step 710), the SP-AP download client 161 downloads and installs the install file of the SP-AP 16 indicated by each SP-AP identifier included in the association SP-AP information from the SP-AP providing system 4 into the smartphone 1 (step 712).

The correspondence between the installed SP-AP identifier and the H-AP identifier for which the SP-AP identifier is obtained as the identifier of the association SP-AP in the association SP-AP information obtained in step 708 is held for deciding the identifier of the H-AP for which the association SP-AP in step 706 is already installed in the smartphone 1 (step 714).

The SP-AP download client 161 performs the following operations for the download/install processing in step 712. In other words, the SP-AP download client 161 issues the download request for which the SP-AP identifier is designated to the SP-AP download server 42 of the SP-AP providing system 4, and the SP-AP download server 42 reads the install file of the SP-AP 16 indicated by the designated SP-AP identifier from the SP-AP database 41 and transfers it to the SP-AP download client 161. The SP-AP download client 161 temporarily stores the transferred install file of the SP-AP 16 in the storage unit 18, and then develops it to install the SP-AP 16 in the smartphone 1 so that the SP-AP 16 is one of the SP-AP 16 provided in the smartphone 1.

Then, the in-vehicle device compatible download processing ends.

The in-vehicle device compatible download processing performed by the SP-AP manager 162 of the smartphone 1 has been described above.

An exemplary SP compatible download processing is shown in FIG. 6a.

As shown, the user of the in-vehicle device 2 uses the H-AP download client 261 of the in-vehicle device 2 to download and install H-AP Y from the H-AP providing system 5 into the in-vehicle device 2 (#1).

Thereafter, when the smartphone 1 is connected to the in-vehicle device 2, the SP-AP manager 162 of the smartphone 1 obtains the H-AP Y identifier as the H-AP list from the H-AP manager 262 of the in-vehicle device 2 (#2).

The SP-AP manager 162 of the smartphone 1 transmits the obtained H-AP Y identifier and the SP-AP execution environment of the smartphone together with the association SP-AP information request to the SP-AP providing system 4 (#3), and obtains the identifier of the SP-AP X which is the association SP-AP of the H-AP Y adapted to the SP-AP execution environment of the smartphone as the association SP-AP information (#4).

The SP-AP manager 162 of the smartphone 1 notifies the SP-AP download client 161 of the obtained SP-AP X identifier to download and install the SP-AP X from the SP-AP providing system 4 into the smartphone 1 (#5).

The second embodiment of the present invention has been described above.

In the second embodiment, the SP-AP providing system 4 is provided with the SP-AP correspondence table 43 and the SP-AP manager 162 of the smartphone 1 obtains the identifier of the association SP-AP adapted to the SP-AP execution environment of the smartphone for the H-AP whose identifier is obtained from the in-vehicle device 2 from the SP-AP providing system 4, but the smartphone 1 may be provided with the SP-AP correspondence table 43 and the SP-AP manager 162 may refer to the SP-AP correspondence table 43 and obtain the identifier of the association SP-AP adapted to the SP-AP execution environment of the smartphone for the H-AP whose identifier is obtained from the in-vehicle device 2.

In this way, according to the second embodiment, the appropriate SP-AP 16 associated with the H-AP 26 can be automatically installed in the smartphone 1 only by user's downloading and installing the H-AP 26 in the in-vehicle device 2. Thus, the user's work of installing mutually-associated applications into the in-vehicle device 2 and the smartphone 1 is facilitated.

A third embodiment of the present invention will be described below.

In the third embodiment, the SP-AP providing system 4 is configured of the SP-AP database 41 and the SP-AP download server 42 and the H-AP providing system 5 is not configured of them.

The structure of the in-vehicle device 2 and the smartphone 1 is the same as that in FIG. 2.

In the third embodiment, the SP-AP database 41 is provided with the install file of the same SP-AP 16 per H-AP execution environment of each association H-AP of the SP-AP 16.

The install file of the SP-AP 16 corresponding to a H-AP execution environment includes SP-APP install data for installing the SP-AP 16 in the smartphone 1 and the install file of the association H-AP of the corresponding H-AP execution environment in a package.

Figure 8A:
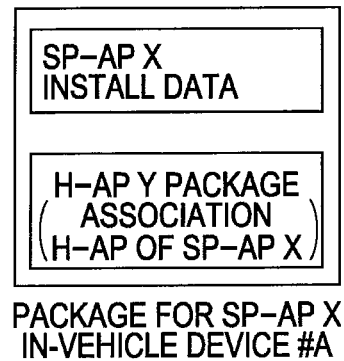
FIG. 8 is a diagram showing a download menu, an install file and an H-AP install processing according to a third embodiment of the present invention.

In other words, assuming that the H-AP execution environment is the in-vehicle device machine type, for example, as shown in FIG. 8a, the install file "package for SP-AP X in-vehicle device A" corresponding to the in-vehicle device machine type A of the SP-AP X as the SP-AP 16 for the smartphone machine type R includes various items of data "SP-AP X install data" to be installed in the smartphone 1 of SP-AP X and the install file "H-AP Y package" for the in-vehicle device machine type A of H-AP Y which is the association H-AP for the in-vehicle device machine type A of SP-AP X in a package. In other words, the "H-AP Y package" is included in the "package for SP-AP X in-vehicle device A" as one item of attached data of SP-AP X. The install file "H-AP Y package" for the in-vehicle device machine type A of H-AP Y is a file in which various items of data for installing the H-AP Y are packaged.

Figure 8B:
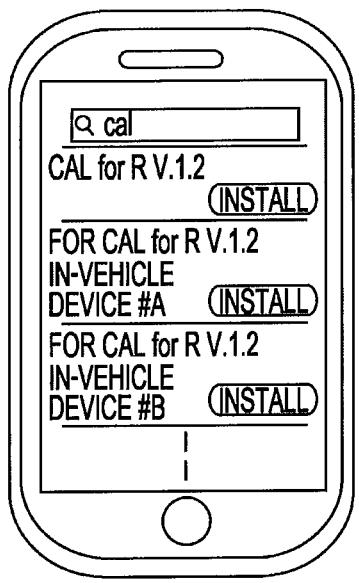

When using the SP-AP download client 161 of the smartphone 1 to download the SP-AP 16 from the SP-AP providing system 4, the user uses an install file select menu as shown in FIG. 8b provided by the SP-AP download server 42 of the SP-AP providing system 4 to select and download the SP-AP 16 install file corresponding to the H-AP execution environment of the user-utilizing in-vehicle device 2.

When downloading the SP-AP 16 install file, the SP-AP download client 161 of the smartphone 1 develops the SP-AP 16 install file, uses the SP-AP install data included in the SP-AP 16 install file to install the SP-AP 16 in the smartphone 1, and holds the install file of the association H-AP included in the SP-AP 16 install file as the association H-AP data of the SP-AP 16 in the storage unit 18.

Figure 8C:
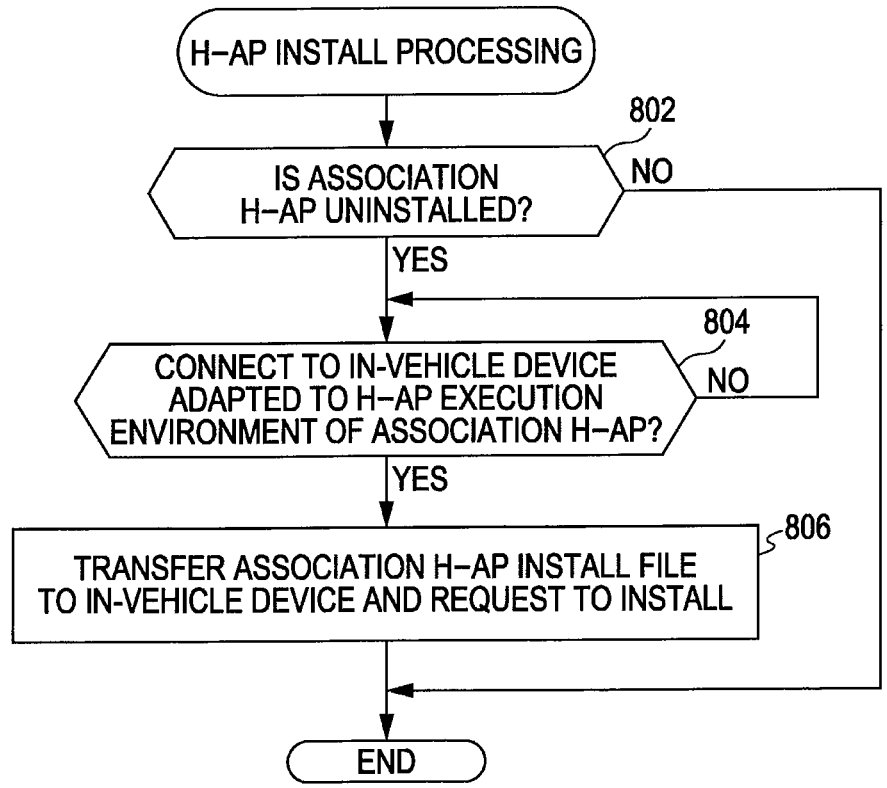

Then, the SP-AP 16 installed in the smartphone 1 in this way is configured to automatically perform the H-AP install processing shown in FIG. 8c on being activated in addition to the SP-AP processing.

As shown, in the H-AP install processing, a check is made as to whether the H-AP 26 install request in step 806 described later has been already made (step 802), when already made, the H-AP install processing ends.

On the other hand, when not made (step 802), the connection of the in-vehicle device 2 adapted to the H-AP execution environment (such as machine type) to which the install file of the association H-AP held as the association H-AP data of the SP-AP 16 in the storage unit 18 corresponds is monitored (step 804), if the in-vehicle device 2 is connected, the install file of the association H-AP held as the association H-AP data of the SP-AP 16 is transferred to the H-AP manager 262 of the in-vehicle device 2, a request of installing the transferred install file of the association H-AP is issued (step 806), and the H-AP install processing ends.

On the other hand, when receiving the install request, the H-AP manager 262 of the in-vehicle device 2 develops the transferred install file of the association H-AP to install the association H-AP in the in-vehicle device 2.

The third embodiment of the present invention has been described above. There has been assumed above that the H-AP install processing shown in FIG. 8c is performed by the association SP-AP of the association H-AP to be installed in the in-vehicle device 2, but the independent SP-AP 16 for performing only the H-AP install processing may be provided for performing only the H-AP install processing. In this case, the install data on the independent SP-AP 16 for performing only the H-AP install processing is included in the same install file as the association SP-AP of the association H-AP to be installed in the in-vehicle device 2 in a package, and is installed together with the association SP-AP in the smartphone 1.

In this way, according to the third embodiment, the appropriate H-AP 26 associated with the SP-AP 16 can be automatically installed in the in-vehicle device 2 only by user's downloading and installing the SP-AP 16 in the smartphone 1. The user's work of installing mutually-associated applications into the in-vehicle device 2 and the smartphone 1 is facilitated.

A fourth embodiment of the present invention will be described below.

The fourth embodiment is such that the relationship between the in-vehicle device 2 and the smartphone 1 in the third embodiment is reversed in terms of the procedure of downloading and installing the SP-AP 16 and the H-AP 26.

In the fourth embodiment, the H-AP providing system 5 is configured of the H-AP database 51 and the H-AP download server 52 and the SP-AP providing system 4 is not provided with them.

The structure of the smartphone 1 and the in-vehicle device 2 is the same as that in FIG. 2.

In the fourth embodiment, the H-AP database 51 is provided with the install file of the same H-AP 26 per SP-AP execution environment of each association SP-AP of the H-AP 26.

The install file of the H-AP 26 corresponding to a SP-AP execution environment includes the H-AP install data for installing the H-AP 26 in the in-vehicle device 2 and the install file of the corresponding SP-AP execution environment in a package.

Figure 9A:
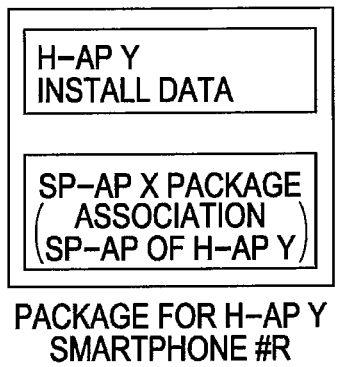
FIG. 9 is a diagram showing a download menu, an install file and an SP-AP install processing according to a fourth embodiment of the present invention.

In other words, assuming that the SP-AP execution environment is the smartphone machine type, for example, as shown in FIG. 9a, the install file "package for H-AP 26 X smartphone R" corresponding to the smartphone machine type R of H-AP Y as the H-AP 26 for the in-vehicle device machine type A includes the install data file "SP-AP X package" for the smartphone machine type R of SP-AP X as the association SP-AP for the smartphone machine type R of the H-AP 26 X in addition to various items of data "H-AP Y install data" for installing the H-AP Y in the in-vehicle device 2 in a package. In other words, the "SP-AP X package" is included in the "H-AP 26 X smartphone R package" as one item of attached data of the H-AP Y. The install file "SP-AP X" for the smartphone machine type R of the SP-AP X is a file in which various items of data for installing the SP-AP X are packaged.

Figure 9B:
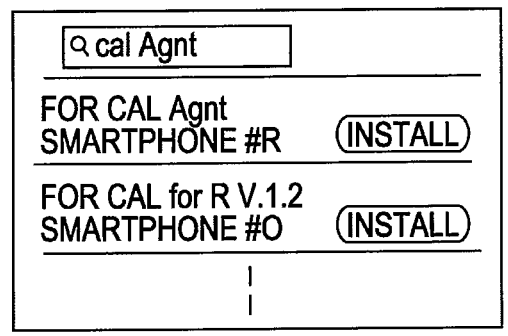

When using the H-AP download client 261 of the in-vehicle device 2 to download the H-AP 26 from the H-AP providing system 5, the user uses an install file select menu as shown in FIG. 9b provided by the H-AP download server 52 of the H-AP providing system 5 to select and download the install file of the H-AP 26 corresponding to the SP-AP execution environment in the user-utilizing smartphone 1.

When downloading the H-AP 26 install file, the H-AP download client 261 of the in-vehicle device 2 develops the H-AP 26 install file, uses the H-AP install data included in the H-AP 26 install file to install the H-AP 26 in the in-vehicle device 2, and holds the install file of the association SP-AP included in the H-AP 26 install file as the association SP-AP data of the H-AP 26 in the storage device 28.

Figure 9C:
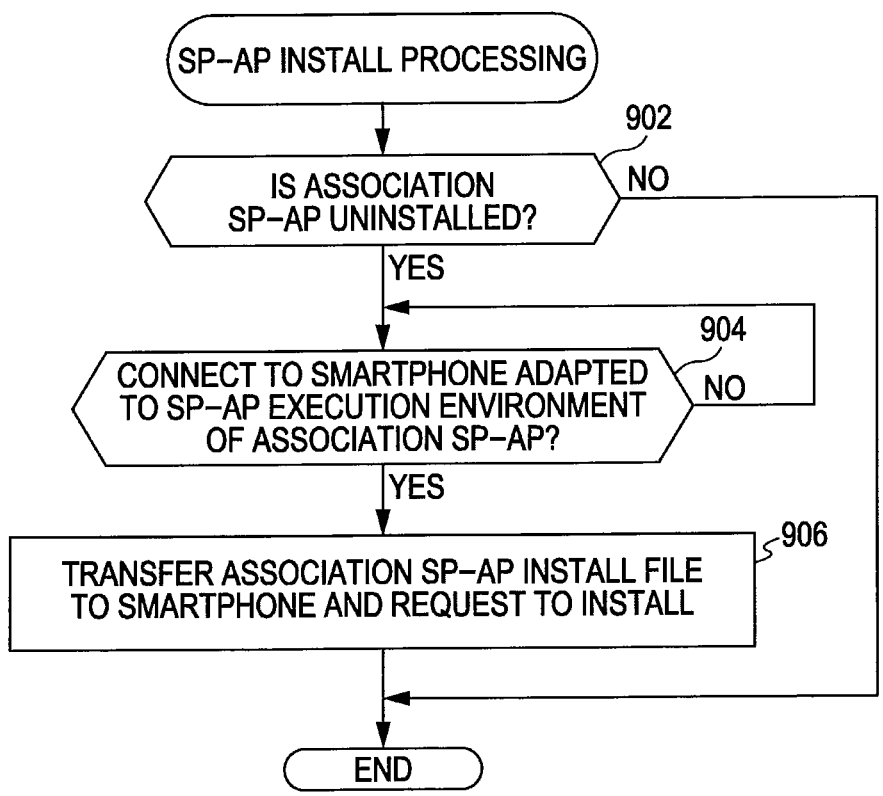

Then, the H-AP 26 installed in the in-vehicle device 2 in this way is configured to automatically perform the SP-AP install processing shown in FIG. 9c on being activated in addition to the H-AP processing.

As shown, in the SP-AP install processing, a check is made as to whether the request of installing the SP-AP 16 in step 906 described later has been already made (step 902), and when made, the SP-AP install processing ends.

On the other hand, when not made (step 902), the connection of the smartphone 1 adapted to the SP-AP execution environment (such as machine type) to which the install file of the association SP-AP held as the association SP-AP data of the H-AP 26 in the storage device 28 corresponds is monitored (step 904), and when the smartphone 1 is connected, the install file of the association SP-AP held as the association SP-AP data of the H-AP 26 is transferred to the SP-AP manager 162 of the smartphone 1 and the request of installing the transferred install file of the association SP-AP is issued (step 906) so that the SP-AP install processing ends.

On the other hand, when receiving the install request, the SP-AP manager 162 of the smartphone 1 develops the transferred install file of the association SP-AP to install the association SP-AP in the smartphone 1.

The fourth embodiment of the present invention has been described above. There has been configured above such that the SP-AP install processing shown in FIG. 9c is performed by the association H-AP of the association SP-AP to be installed in the smartphone 1, but the independent H-AP 26 for performing only the SP-AP install processing may be provided for performing the SP-AP install processing. In this case, the install data on the independent H-AP 26 for performing only the SP-AP install processing is included in the same install file as the association H-AP of the association SP-AP to be installed in the smartphone 1 in a package and is installed together with the association H-AP in the in-vehicle device 2.

In this way, according to the fourth embodiment, the appropriate SP-AP 16 associated with the H-AP 26 can be automatically installed in the smartphone 1 only by user's downloading and installing the H-AP 26 in the in-vehicle device 2. Thus, the user's work of installing mutually-associated applications into the in-vehicle device 2 and the smartphone 1 is facilitated.

The embodiments of the present invention have been described above.

There has been described above the example in which the host device is the in-vehicle device 2 and the portable device connected to the host device is the smartphone 1, but the embodiments can be similarly applied to a case in which the host device is other than the in-vehicle device 2 and the portable device is other than the smartphone 1, such as cell phone, PDA, portable music player or potable game player.

Although preferred embodiments have been described in detail, the present invention is not limited to these specific embodiments. Rather, various modifications and changes can be made without departing from the scope of the present invention as described in the accompanying claims. Accordingly, all such modifications are intended to be included within the scope of this invention as defined in the following claims.

What is claimed is:

1. An install system comprising:
a host device;
a portable device configured to connect with the host device; and
a host device application providing system to which the host device is accessible via a network,
wherein the host device includes:
  a host device application execution unit configured to execute host device applications as applications for host devices; and
  an automatic install unit,
wherein the portable device includes a portable device application execution unit configured to execute portable device applications as applications for portable devices;
wherein the host device application providing system includes:
  a host device application database for storing install data on host device applications contained therein; and
  a host device application download server for transferring the install data on the host device applications stored in the host device application database, to the host device, and
wherein the automatic install unit of the host device:
  obtains an identification of a portable device application installed in the portable device from the portable device connected to the host device;
  downloads install data on a host device application operating in association with the portable device application whose identification is obtained from the host device application download server; and
  utilized the install data to install the host device application operating in association with the portable device application whose identification is obtained in the host device.

2. The install system according to claim 1,
wherein the host device application providing system includes a correspondence management unit configured to manage correspondence between the portable device applications and the host device applications operating in association with the portable device applications, and forwards the correspondences in response to a request from the host device; and
wherein the automatic install unit of the host device queries a host device application operating in association with the portable device application whose identification is obtained from the portable device to the correspondence management unit and specifies it.

3. The install system according to claim 2,
wherein the correspondence management unit of the host device application providing system manages correspondences between the portable device applications, the host device applications operating in association with the portable device applications, and host device application execution environments to which the host device applications correspond, and forwards the correspondences in response to a request from the host device; and
wherein the automatic install unit of the host device queries a host device application corresponding to a host device application execution environment of the host device and operating in association with the portable device application whose identification is obtained from the portable device to the correspondence management unit and specifies it, downloads install data on the specified host device application from the host device application download server, and uses the install data to install the host device application operating in association with the portable device application whose identification is obtained in the host device.

4. The install system according to claim 3,
wherein the host device is an in-vehicle device; and
wherein the host device application execution environment is a in-vehicle device machine type.

5. An install system comprising:
a portable device;
a host device configured to connect to the portable device; and a portable device application providing system to which the portable device is accessible via a network,
wherein the portable device includes:
a portable device application execution unit configured to execute portable device applications as applications for portable devices; and
an automatic install unit;
wherein the host device includes
a host device application execution unit configured to execute host device applications as applications for host devices;
wherein the portable device application providing system includes:
a portable device application database for storing install data on portable device applications therein; and
a portable device application download server configured to transfer the install data on the portable device applications stored in the portable device application database to the portable device, and
wherein the automatic install unit of the portable device
obtains an identification of the host device application installed in the host device from the host device connected to the portable device,
downloads install data on a portable device application operating in association with the host device application whose identification is obtained from the portable device application download server, and
utilized the install data to install the portable device application operating in association with the host device application whose identification is obtained in the portable device.

6. The install system according to claim 5,
wherein the portable device application providing system comprises a correspondence management unit configured to manage correspondence between the host device applications and the portable device applications operating in association with the host device applications, and configured to reply to the correspondences in response to a request from the portable device; and
wherein the automatic install unit of the portable device queries a portable device application operating in association with the host device application whose identification is obtained from the host device to the correspondence management unit and specifies it.

7. The install system according to claim 6,
wherein the correspondence management unit of the portable device application providing system is configured to manage correspondence between the host device applications, the portable device applications operating in association with the host device applications and portable device application execution environments to which the portable device applications correspond, and replies to the correspondence in response to a request from the portable device; and
wherein the automatic install unit of the portable device queries a portable device application corresponding to a portable device application execution environment of the portable device and operating in association with the host device application whose identification is obtained from the host device to the correspondence management unit and specifies it, downloads install data on the specified portable device application from the portable device application download server, and uses the install data to install the portable device application operating in association with the host device application whose identification is obtained in the portable device.

8. An install system comprising:
a portable device;
a host device connectable to the portable device; and
a portable device application providing system to which the portable device is accessible via a network,
wherein the portable device application providing system includes:
a portable device application database configured to store install data on portable device applications as applications for portable devices therein; and
a portable device application download server configured to transfer the install data on the portable device applications stored in the portable device application database to the portable device,
wherein the host device includes:
a host device application execution unit configured to execute host device applications as applications for host devices; and
an install processing unit,
wherein the portable device includes:
a portable device application execution unit configured to execute portable device applications installed in the portable device;
a download unit configured to download install data on the portable device applications from the portable device application download server, and configured to install the portable device applications in the portable device; and
an association application install data transfer unit,
wherein the install data on the portable device applications to be transferred by the portable device application download server includes install data on the host device applications operating in association with the portable device applications,
wherein when connected to the host device, the association application install data transfer unit of the portable device is configured to transfer the install data on the host device applications included in the install data on the portable device applications to the host device, and
wherein the install processing unit of the host device utilizes the install data on the host device applications transferred from the association application install data transfer unit of the portable device to install the host device applications in the host device.

9. The install system according to claim 8,
wherein the association application install data transfer unit of the portable device is a portable device application installed in the portable device by the download unit by use of the install data on the portable device applications including the install data on the host device applications to be transferred by the association application install data transfer unit to the host device.

10. An install system comprising:
a host device;
a portable device configured to connect to the host device; and
a host device application providing system to which the host device is accessible via a network,
wherein the host device application providing system includes:
a host device application database configured to store install data on host device applications as applications for the host device therein; and
a host device application download server configured to transfer the install data on the host device applications stored in the host device application database to the host device, wherein the portable device includes:
a portable device application execution unit configured to execute portable device applications as applications for portable devices; and
an install processing unit,
wherein the host device includes:
a host device application execution unit configured to execute host device applications installed in the host device;
a download unit configured to download install data on the host device applications from the host device application download server, and configured to install the host device applications in the host device; and
an association application install data transfer unit,
wherein the install data on the host device applications to be transferred by the host device application download server includes install data on the portable device applications operating in association with the host device applications,
wherein when connected to the portable device, the association application install data transfer unit of the host device transfers the install data on the portable device applications included in the install data on the host device applications to the portable device, and
wherein the install processing unit of the portable device utilized the install data on the portable device applications transferred from the association application install data transfer unit of the host device to install the portable device applications in the portable device.

11. The install system according to claim 10,
wherein the association application install data transfer unit of the host device is a host device application installed in the host device by the download unit by use of the install data on the host device applications including the install data on the host device applications to be transferred by the association application install data transfer unit to the portable device.

12. A method for installing applications operating in a mutually-associated manner in a portable device and a host device connectable to the portable device, the method comprising:
downloading install data on portable device applications as applications for the portable device,
wherein the install data on the portable device applications includes install data on association applications as applications for the host device operating in association with the portable device applications,
the method further comprising:
installing the portable device applications in the portable device by use of the downloaded install data on the portable device applications and holding install data on association applications included in the downloaded install data on the portable device applications in the portable device;
wherein when the portable device is connected to the host device, transferring the held install data on the association applications to the host device; and
installing the association applications in the host device by use of the install data on the association applications transferred from the portable device.

13. A method for installing applications operating in a mutually-associated manner in a portable device and a host device connectable to the portable device, the method comprising:
downloading install data on host device applications as applications for the host device in the host device,
wherein the install data on the host device applications includes install data on association applications as the portable device applications operating in association with the host device applications,
the method further comprising:
installing the host device applications in the host device by use of the downloaded install data on the host device applications and holding install data on association applications included in the downloaded install data on the host device applications in the host device;
wherein when the host device is connected to the portable device, transferring the held install data on the association applications to the portable device; and
installing the association applications in the portable device by use of the install data on the association applications transferred from the host device.

* * * * *